United States Patent
Thellefsen et al.

(10) Patent No.: US 10,640,376 B2
(45) Date of Patent: May 5, 2020

(54) PROCESS FOR THE PRODUCTION OF SULFUR TRIOXIDE

(71) Applicant: Haldor Topsøe A/S, Kgs. Lyngby (DK)

(72) Inventors: Morten Thellefsen, Hillerød (DK); Martin Møllerhøj, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/309,330

(22) PCT Filed: Jul. 4, 2017

(86) PCT No.: PCT/EP2017/066594
§ 371 (c)(1),
(2) Date: Dec. 12, 2018

(87) PCT Pub. No.: WO2018/015139
PCT Pub. Date: Jan. 25, 2018

(65) Prior Publication Data
US 2019/0177161 A1  Jun. 13, 2019

(30) Foreign Application Priority Data
Jul. 21, 2016 (DK) .................. 2016 00439

(51) Int. Cl.
*C01B 17/765* (2006.01)
*C01B 17/80* (2006.01)
(Continued)

(52) U.S. Cl.
CPC .......... *C01B 17/765* (2013.01); *C01B 17/508* (2013.01); *C01B 17/58* (2013.01); *C01B 17/762* (2013.01); *C01B 17/803* (2013.01); *C01B 17/806* (2013.01); *C01B 17/88* (2013.01); *F22B 9/04* (2013.01); *F22B 15/00* (2013.01);
(Continued)

(58) Field of Classification Search
CPC ......... C01B 17/69; C01B 17/74; C01B 17/76; C01B 17/765; C01B 17/80; C01B 17/901; B01D 53/002; B01D 53/50; B01D 53/64; B01D 53/74; B01D 53/75; B01D 53/8609; B01D 2202/00; B01D 2257/302; B01D 2257/60
See application file for complete search history.

(56) References Cited

U.S. PATENT DOCUMENTS 1,405,669 A * 2/1922 Chase .................... C01B 17/76
 423/531
1,545,142 A * 7/1925 Howard .................. C01B 17/56
 423/531
(Continued)

FOREIGN PATENT DOCUMENTS

EP 0 218 411 A1 4/1987
EP 0 516 001 A1 12/1992
(Continued)

*Primary Examiner* — Timothy C Vanoy
(74) *Attorney, Agent, or Firm* — Blank Rome LLP (57) ABSTRACT

Sulfur trioxide is produced from a feed stream comprising sulfur-containing compounds and dissolved metals, such as alkali metals, in a plant comprising an incineration furnace, a waste heat boiler, a dilution air heater, a dust removal absorber and an $SO_2$ converter. The plant may further comprise a sulfuric acid condenser for the production of sulfuric acid.

12 Claims, 6 Drawing Sheets

(51) Int. Cl.
*C01B 17/76* (2006.01)
*C01B 17/50* (2006.01)
*C01B 17/88* (2006.01)
*F28D 9/00* (2006.01)
*F22B 15/00* (2006.01)
*F22B 9/04* (2006.01)
*C01B 17/58* (2006.01)
*F27D 17/00* (2006.01)

(52) U.S. Cl.
CPC ...... *F28D 9/0043* (2013.01); *F27D 2017/006* (2013.01); *Y02P 20/129* (2015.11)

(56) References Cited

U.S. PATENT DOCUMENTS

| | | | | |
|---|---|---|---|---|
| 1,915,270 | A | * | 6/1933 | Clark ................ C01B 17/76 |
| | | | | 423/531 |
| 1,923,256 | A | * | 8/1933 | Clark ................ C01B 17/76 |
| | | | | 423/533 |
| 3,147,074 | A | | 9/1964 | Maurer |
| 4,578,262 | A | | 3/1986 | Cameron |
| 2012/0017110 | A1 | | 1/2012 | Omar |

FOREIGN PATENT DOCUMENTS

| | | |
|---|---|---|
| EP | 0 570 324 A1 | 11/1993 |
| EP | 2 942 323 A1 | 11/2015 |
| GB | 1288851 A | 9/1972 |
| WO | WO 2008/064698 A1 | 6/2008 |
| WO | WO 2014/094838 A1 | 6/2014 |
| WO | WO 2014/144699 A1 | 9/2014 |

\* cited by examiner

PROCESS FOR THE PRODUCTION OF SULFUR TRIOXIDE

The present invention relates to a process for the production of sulfur trioxide to be used for sulfuric acid production from sulfur-containing feeds with high potential for formation of so-called sticky dust, which can plug conventional waste heat boilers, thereby forcing unplanned shut-downs of the entire sulfuric acid plant.

More specifically, the invention provides a method for the production of sulfur trioxide from a feed stream comprising sulfur-containing compounds and dissolved metals such as alkali metals, said process comprising the following steps: incineration in the presence of an $O_2$-rich stream, whereby the sulfur-containing compounds in the feed stream are converted to $SO_2$,
cooling of the gas in a waste heat boiler to recover heat as high pressure steam, wherein at least 50% of the duty in the waste heat boiler is transferred by gas and particle radiation,
further cooling of the process gas, that leaves the waste heat boiler, in a dilution air heater,
adding dilution air to the process gas to provide sufficient oxygen for the oxidation of $SO_2$ to $SO_3$ in an $SO_2$ converter, and
feeding the diluted process gas to an $SO_2$ converter consisting of a number of catalyst layers with heat exchangers installed between the catalyst layers.

The invention further relates to a plant for the production of sulfur trioxide by the above method, said plant comprising an incineration furnace, a waste heat boiler, a dilution air heater and a dust removal absorber. Specifically, for use in sulfuric acid production the plant further comprises an $SO_2$ converter and a sulfuric acid condenser.

The feed stream could be spent sulfuric acid originating from an alkylation process, in which sulfuric acid has been acting as a catalyst for the production of alkylate, i.e. a fuel additive. In the alkylation process, the sulfuric acid gets contaminated with water and acid soluble oils and to some extent corrosion products from the plant equipment (Fe, Cr, Ni ions) and ingress of alkaline (Na, K) ions, e.g. from an alkylate purifying equipment. This acid is withdrawn from the alkylation process, regenerated to concentrated sulfuric acid in a separate sulfuric acid plant and returned to the alkylation process.

Another example of a feed stream is the products from a coke oven gas cleaning process, in which $H_2S$ and HCN present in the coke oven gas is absorbed into an aqueous alkaline solution and converted into elemental sulfur (S) and salts of $SCN^-$, $S_2O_3^{2-}$ and $SO_4^{2-}$. Usually the corresponding cation is $NH_4^+$ or $Na^+$, depending on how the alkalinity is controlled, e.g. by $NH_3$ or NaOH. The trade names for such coke oven gas cleaning processes are e.g. HPF, PDS, Perox and Stretford. These products are of low quality and value and can be converted into concentrated sulfuric acid to increase quality and value of the sulfur.

In the following, the invention is described in more detail with reference to the figures, where.

Figure 1:
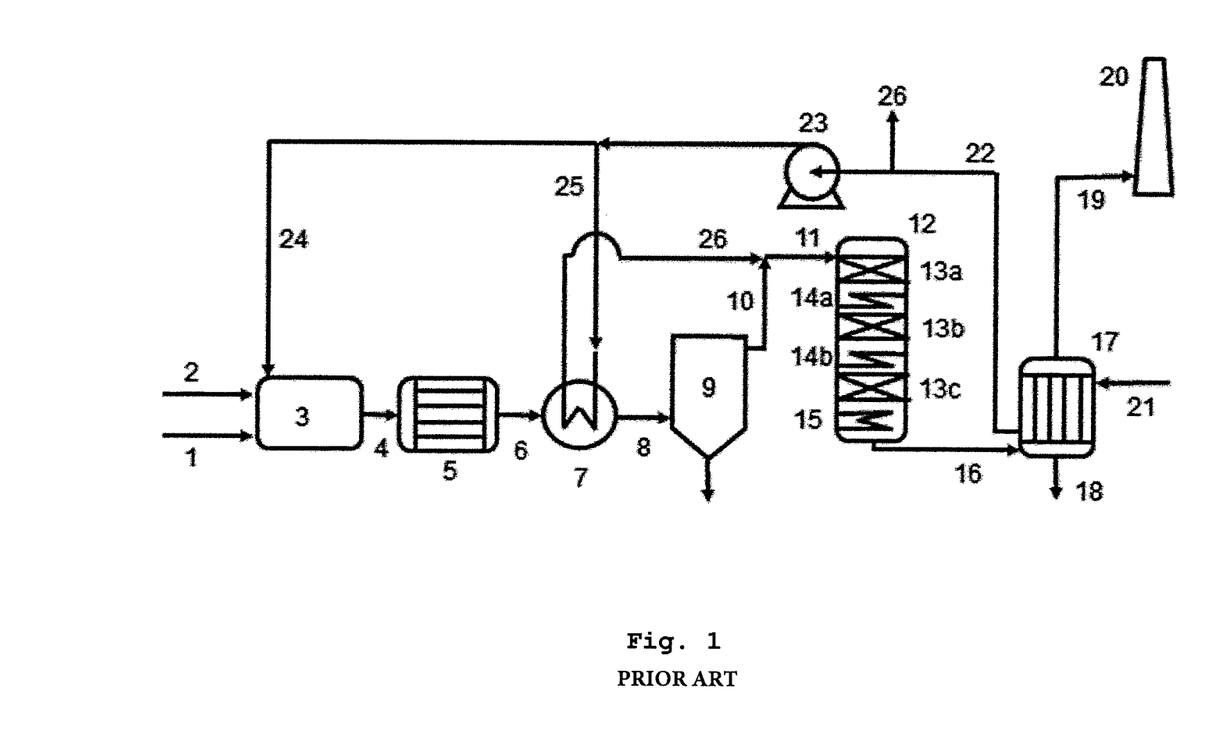
FIG. 1 is a known process layout for converting a feed stream into concentrated sulfuric acid.

The commonly used process layout for converting these feeds into concentrated sulfuric acid is shown in FIG. 1. In the first step, the feed stream comprising sulfur compounds and dissolved metals and alkali metals 1 is fed into a furnace 3 operating at 900-1100° C. In this furnace, the following reactions take place, depending on the exact composition of the feed:

$H_2SO_4 \rightarrow SO_2 + 0.5 O_2 + H_2O$

Acid soluble oils + $O_2 \rightarrow CO_2 + H_2O + SO_2$ $S + O_2 \rightarrow SO_2$ $SCN^- + 2O_2 \rightarrow SO_2 + CO_2 + 0.5 N_2$ $S_2O_3^{2-} + 0.5 O_2 \rightarrow 2 SO_2$ $SO_4^{2-} \rightarrow SO_2 + O_2$ $CH_4 + 2O_2 \rightarrow CO_2 + 2H_2O$ To maintain the high temperature in the furnace it is often necessary to provide support fuel 2 to ensure a sufficiently high heating value of the feeds. Such support fuels can be $CH_4$, $C_2H_6$ and other hydrocarbon-based fuels, but also $H_2S$, CO and $H_2$ are applicable.

To provide sufficient $O_2$ for the oxidation reactions described above, an $O_2$ rich stream 24 is directed to the furnace. Most often atmospheric air is used as hot air 22 leaves the sulfuric acid condenser 17 in the plant.

In some applications it can be beneficial to use enriched $O_2$ (i.e. >21 vol %), but usually the cost of air enrichment is higher than the benefit from the higher $O_2$ concentration.

The process gas leaving the furnace 4 is cooled to 450-600° C. in a waste heat boiler 5 to recover heat in the form of high pressure steam. The steam pressure is in the range 20-85 bar gauge.

The most common type of waste heat boiler for these applications is the so-called fire tube boilers, in which the process gas flows through a number of parallel horizontal tubes. The gas velocity is high (usually 25-50 m/sec) to provide a high convective heat transfer coefficient for efficient heat transfer to the cooling media on the shell side of the tubes. The cooling media is usually high pressure water, and heat is absorbed by means of phase transfer (i.e. boiling). This design is well known and used in the industry.

Another type of waste heat boiler is the so-called water tube boiler, in which the process gas flows on the shell side of the tubes and water/steam is flowing on the inside of the tubes. Water tube boilers also rely on convective heat transfer, and thus the gas velocity must be high and the distance between the tubes must be small.

The process gas 6 leaving the waste heat boiler is then further cooled to 375-450° C. in a dilution air heater 7. If there is no need for air dilution, a steam superheater could be installed, or the upstream waste heat boiler 5 could be designed to cool the process gas to 375-400° C.

To protect downstream equipment, dust is removed from the process gas in an electrostatic precipitator 9. Other types of dust removal equipment, such as ceramic filters, can also be used.

After dust removal, hot dilution air 26 is added to the process gas 10 in order to provide sufficient oxygen for the catalytic oxidation of $SO_2$ to $SO_3$. This position for air addition ensures that the size of the furnace 3, the waste heat boiler 5, the dilution air heater 7 and the electrostatic precipitator 9 is minimized.

The diluted process gas 11 then enters the $SO_2$ converter 12 at 375-420° C. The converter consists of a number of catalyst layers 13 with heat exchangers 14 installed between the catalyst layers. The conversion of $SO_2$ to $SO_3$ is an exothermal reaction, and in order to maximize the overall SO$_2$ conversion it is normal practice to use a number of catalyst layers, each consecutive layer operating at a lower temperature, to ensure the highest conversion efficiency possible. The number of catalyst layers is between 1 and 4, with 3 as the most common number for these applications.

The heat exchangers 14 between the catalyst layers are designed to provide the optimal process gas temperature at the inlet of each of the catalyst layers 13. As cooling media, usually saturated and/or superheated steam is used, but air, molten salt or hot pressurized water (boiler water) can be used too.

After the final catalyst layer 13c, the converted process gas is cooled to 250-310° C. in a boiler 15 before the process gas leaves the SO$_2$ converter 12. In this temperature range, the SO$_3$ starts to react with H$_2$O in the gas phase to form H$_2$SO$_4$ vapor.

This reaction proceeds to completion in the sulfuric acid condenser 17, in which the process gas is cooled to 60-200° C. The majority of the sulfuric acid vapor condenses, and liquid concentrated H$_2$SO$_4$ 18 is withdrawn from the bottom of the condenser, while a cleaned gas 19 leaves at the top of the condenser. Depending of the environmental legislation, the cleaned gas may require further cleaning steps before being emitted to the atmosphere via a stack 20.

The H$_2$SO$_4$ product 18 is cooled to around 40° C. and sent to battery limit for storage or direct use. The H$_2$SO$_4$ concentration is 93-98.5% w/w, depending on the H$_2$O/SO$_3$ ratio in the process gas 16.

The cooling media 21 for the sulfuric acid condensation is air, and the hot air 22 leaving the condenser can be recycled back to the front end of the sulfuric acid plant as preheated combustion air 24 and hot dilution air 25. A hot air blower 23 is needed to recycle the hot air. Any hot air not used for these purposes 26 can be mixed with the cleaned gas 19 to provide a dry clean gas (and thus dry stack), or the heat can be utilized for e.g. boiler feed water preheating or other heating/drying purposes.

In the sulfuric acid condenser 17, glass tubes are used to separate the process gas from the cooling air because metals are not able to withstand the corrosive nature of the hot concentrated sulfuric acid.

The so-called dry gas sulfuric acid technology has a different layout. The furnace and waste heat boiler are similar to those used in the wet gas technology as described above and shown in FIG. 1, but after the waste heat boiler the process gas is quenched to 50-60° C. to wash out dust and remove water from the process gas. The cold dry SO$_2$ containing process gas is then reheated, SO$_2$ is catalytically oxidized to SO$_3$ and the formed SO$_3$ is absorbed into concentrated sulfuric acid in a dedicated absorption tower. Both the wet and dry processes are able to convert the above mentioned feeds, as long as the concentrations of the dust forming metals and alkali metals are sufficiently low. If the tolerance for these impurities is exceeded, both processes will suffer from the effect of dust formation and deposition.

The tolerances for the concentrations of metals and alkali metals in the feed are difficult to quantify, because the formation of sticky dust particles depends on the interaction between the different metals present in the feed and also on the process gas composition.

Na and K are primarily responsible for the formation of sticky particles. With increasing concentrations of Na and K, the formation of sticky particles increases.

This can somehow be compensated for by the presence of e.g. Fe, Al and Mg, which to some extent can "dry out" the particles and decrease the stickiness of them.

Also the presence of SO$_3$ in the process gas will enhance the formation of sticky particles.

Furthermore, the diameter of the tubes in the fire tube waste heat boiler is of importance, as tubes with larger diameters are more resistant towards fouling and plugging than tubes with smaller diameters.

A general rule is that concentrations of Na and K below 25-50 ppm by weight for spent acids from alkylation plants provide a trouble-free operation of the waste heat boiler.

In the furnace 3, the dissolved metals and alkali metals in the feed will form oxides and/or sulfates in either solid or liquid state. The temperature and chemistry of the particles will determine to which extent the particles are liquid. These particles will be carried out of the furnace together with the process gas 4. It is well known in the industry that high concentrations of Na and K will result in the formation of sulfates (such as Na$_2$SO$_4$/K$_2$SO$_4$, but also NaHSO$_4$/KHSO$_4$ and Na$_2$S$_2$O$_7$/K$_2$S$_2$O$_7$), which will be at least partly liquefied at the high furnace temperatures. The sulfates can also combine with other solid compounds, thus forming mixtures with melting temperatures different from the melting point of the sulfate in the pure state. Examples of so-called eutectic mixtures, in which the melting temperature of the mixture is lower than that of the pure state constituents, are Na$_3$Fe(SO$_4$)$_3$, NaFe(SO$_4$)$_2$, K$_3$Fe(SO$_4$)$_3$ and KFe(SO$_4$)$_2$, which have melting temperatures in the range 600-700° C., whereas Na$_2$SO$_4$ has a melting temperature of 885° C.

When these "sticky" particles get into contact with the cold surfaces of the waste heat boiler 5, the particles will stick to the surface and quickly solidify to form a solid deposit layer. The thickness of the deposit layer grows over time, and eventually the layer will become so thick that the process gas flow through the waste heat boiler tube (in a fire tube boiler) or between the waste heat boiler tubes (in a water tube boiler) is hampered to a degree where it is no longer possible to operate the plant, and so the plant must be shut down for these deposits to be removed.

The operating time between such shut-downs can be more than a year for very clean feeds, but for feeds with very high concentration of especially alkali metals, the tubes can plug after less than 24 hours of operation.

To some extent it is possible to prolong the time between shut downs by adding "anti-sticking" compounds, such as MgO or Al$_2$(SO$_4$)$_3$, to the feed streams and/or carry out some sort of in-line cleaning of the waste heat boiler. Such systems could be e.g. soot blowers, air blasters, mechanical cleaning and sonic horns. Due to the mechanical layout of the waste heat boilers with long tubes of a small diameter (fire tube boiler), the effectiveness of these cleaning systems is not good. For tube banks of small distance between the tubes (water tube boiler), the effectiveness of these cleaning systems can be increased by splitting the water tube boiler up in more sections of tube banks with cleaning systems installed between the sections.

For feeds with very high concentration of alkali metals, it is also possible to sacrifice the heat recovery by carrying out a water quench of the process gas from around 1000° C. directly down to 30-60° C. In this process, the sticky dust is dissolved in water and taken out with the waste water, but the process suffers from a very low energy efficiency, a high water consumption and large volumes of waste water.

To have a process for the treatment of the above mentioned difficult feed streams, which furthermore has a high heat recovery, it is proposed to use a different heat exchanger. Such a heat exchanger must be able to cool the process gas in combination with a high resistance towards deposition of sticky dust.

Such a heat exchanger could be a radiation type cooler. One rarely used design is based on two concentric cylindrical ducts, in which the hot process gas containing sticky dust flows in the inner duct and a coolant flows in the annulus between the two ducts. The flow direction of the coolant can either be countercurrent or co-current compared to the process gas flow direction. The coolant is usually hot air, provided at a temperature above the sulfuric acid dew point temperature in the hot process gas.

The diameter of the inner duct is large (>500 mm) and thus plugging is not possible.

The drawback of this radiant cooler is the limited heat transfer capacity: The radiant heat transfer rate is decreased due to high metal temperature of the ducting. Also the convective heat transfer coefficient on the cooling air side is relatively low, and the utilization of the hot cooling air requires additional heat exchangers to convert the heat into e.g. steam, which is more usable in the process industry. The high metal temperatures require a high grade steel, which is expensive.

An alternative radiant-type heat exchanger is recommended for the present application. Different layouts are shown in FIGS. 3 to 6.

Figure 2:
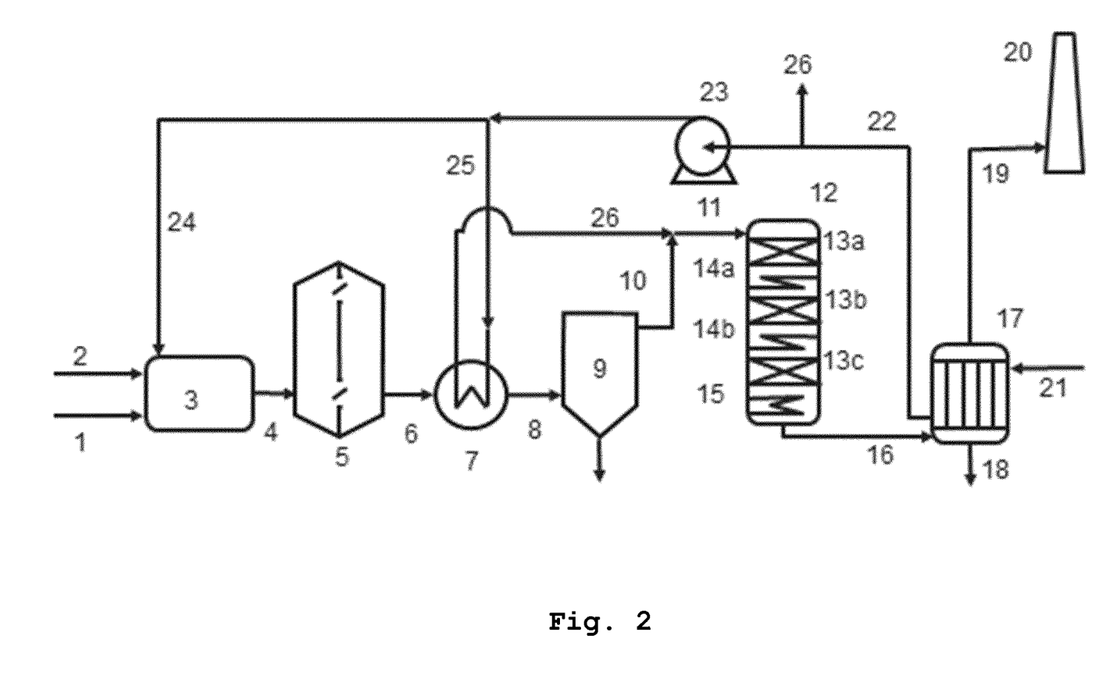
FIG. 2 shows the sulfuric acid process with a new radiant-type boiler to be used according to the invention.

The sulfuric acid process with the new radiant-type boiler is shown in FIG. 2. Only the waste heat boiler 5 has been changed, while the rest of the process layout remains unchanged.

This alternative radiant-type heat exchanger is a so-called membrane wall construction, in which the walls constitute the cooling surfaces. This ensures that the heat transfer area is maximized, and at the same time it ensures that the boiler has no cold spots, where sulfuric acid can condense and cause corrosion.

Figure 3:
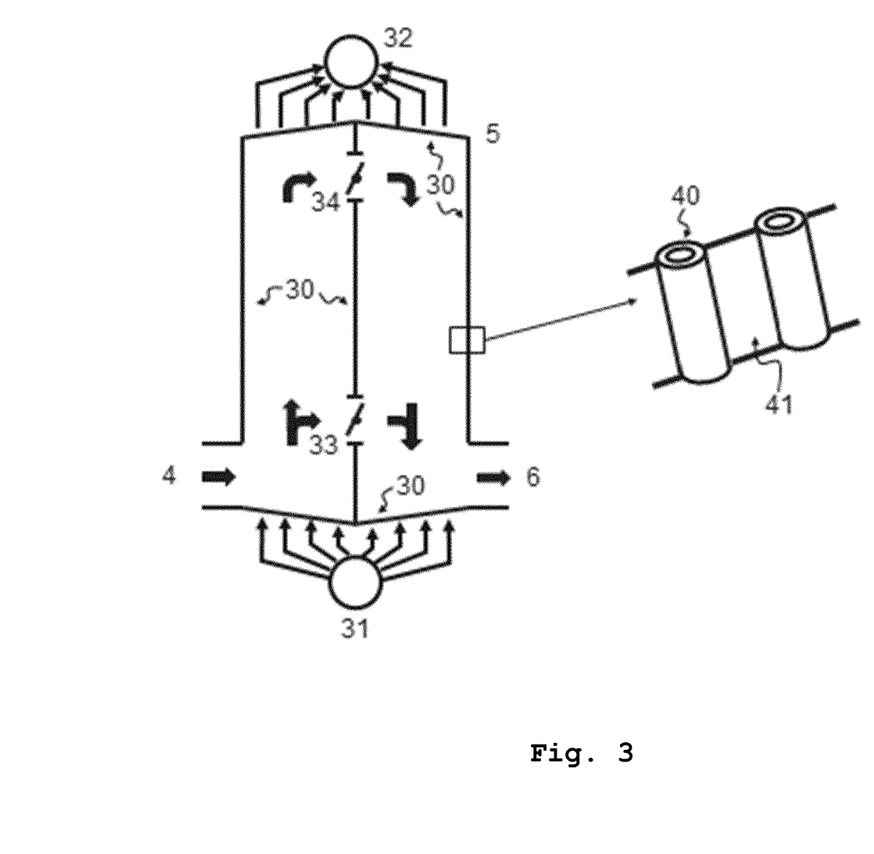
FIGS. 3 to 6 show different alternative radiant-type heat exchangers to be used according to the invention.

An example of a layout of a radiation-type waste heat boiler is shown in FIG. 3.

Hot process gas from the furnace 4 enters the waste heat boiler 5 with a temperature of 900-1100° C. The process gas comprises $SO_2$, $CO_2$, $H_2O$, $N_2$, $O_2$ and small amounts of $SO_3$, $NO_x$ and dust particles composed of oxides/sulfates of typically Fe, Na, K, Cr and Ni.

As the flow of process gas passes through the waste heat boiler, the heat from the process gas is transferred via the boiler wall into the boiler water, thereby forming steam. The cooled process gas leaves the waste heat boiler via the bottom outlet 6.

The wall consists of a number of vertical tubes 40, each separated from each other by metal plates/strips 41, fully welded to the tubes in order to make a gas tight construction. Water/steam flows inside the tubes and cools the tube walls and metal plates, but at the same time ensures a minimum temperature of the metal surfaces. For these applications, this is very useful, as it will prevent sulfuric acid vapor from condensing, which would otherwise cause corrosion of the metal.

Boiler feed water is fed to all pipes via a bottom manifold (31), which receives water from the steam drum located at a certain distance above the top of the heat exchanger. The elevated position is necessary in order to ensure that both water and steam flow by natural circulation. If forced circulation is used, there is no need for the elevation of the steam drum above the waste heat boiler.

The water/steam leaving the pipes in the top of the waste heat boiler is collected in a top manifold 32 before being sent to the same steam drum for water/steam separation.

Since the process gas outlet temperature 6 needs to be controlled for optimal operation of the downstream equipment, it is necessary to be able to bypass a fraction of the hot process gas from the long cooling path and provide a short pass with a low degree of process gas cooling. In FIG. 3, this is achieved by having a main pass damper 34 and a bypass damper 33, the operation of both being controlled by a temperature controller located downstream the boiler. The bypass damper is also a necessity for controlling the outlet temperature when the plant is operated at reduced load, i.e. for this operation the installed cooling surface is larger than required. Also it is common practice to add an extra heat transfer area, such that the boiler can operate well at design load, even if there are deposits on parts of the heat exchange surface, thus hampering heat transfer from the process gas to the cooled surface.

Due to the long wall-to-wall distance it is practically impossible to build up deposit layers so thick that the flow restriction becomes so high that the plant has to shut down due to pressure drop restrictions. Still, some deposits can collect on the boiler walls, thus hampering heat transfer. These deposits can be removed by cleaning systems as described above for the water tube and fire tube boiler. The advantage of the membrane wall boiler is that all heat transfer surfaces are exposed (i.e. no tube banks shadowing or long tubes where the force of the cleaning system quickly wears off), and thus the cleaning systems will have an uninterrupted path between the system and the wall, thereby ensuring maximum effectiveness of the cleaning system.

In FIG. 3, the hot bypass 33 is located slightly elevated compared to the process gas inlet 4. This is in order to protect the bypass damper from any direct radiation from the furnace space upstream the boiler and reduce the process gas temperature by 100-200° C. in order to protect the uncooled surface of the damper from excessive temperature.

In FIG. 3, the boiler is designed with both a main pass and a bypass damper. In principle the boiler could operate with a single damper only (either on the main pass or on the bypass), but the pressure drop in the boiler is very low (<5 mbar), and thus, with a single damper only, it will be difficult to make big changes in the distribution between cooled process gas and hot bypassed process gas. With two dampers, the distribution can in principle be controlled with 0-100% flow through the bypass damper.

Figure 4:
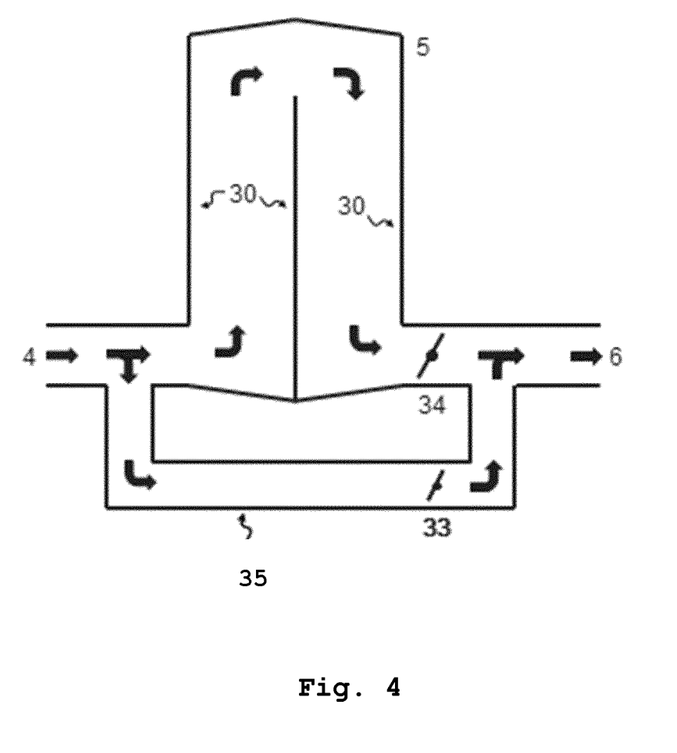

FIG. 4 shows a boiler layout in which the bypass damper 33 and the main pass damper 34 are located outside the boiler. With this layout, the process gas temperature control is just as good as described in FIG. 3. The advantage of this layout is a simpler construction of the tubes in the boiler, as the tubes do not need to be bent to make room for the damper and damper shaft. A drawback of this design could be that the hot ducting and bypass damper are experiencing the high temperature from the furnace, and that may require the use of exotic construction materials and/or lead to a reduced life time of the material.

To reduce plot area, the waste heat boiler consists of two vertical quadratic ducts, where the process gas flows upwards and turns at the top of the boiler. Then it flows downwards and exits at the bottom of the boiler 6.

Figure 5:
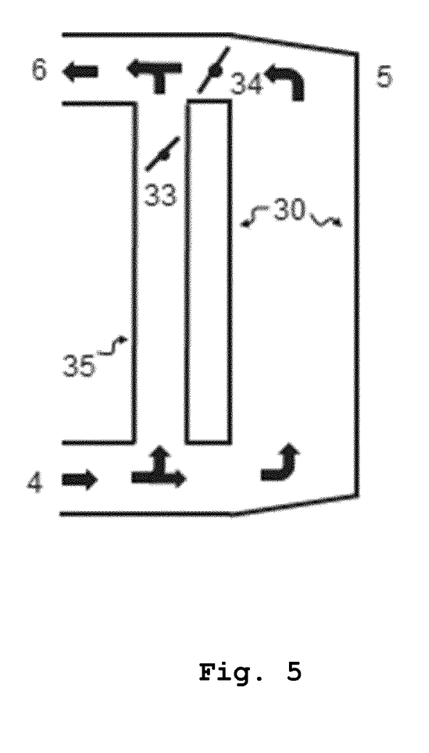

In FIG. 5, the boiler outlet is located at the top of the boiler, but otherwise the layout is as shown in FIG. 4. The advantage of this layout is an even smaller plot area and a reduced duct length, provided that the downstream equipment is located with high elevation, such as the inlet to a catalytic converter 12 with multiple catalyst layers and corresponding inter-bed heat exchangers. The drawback of such a layout is the height of the structure, which requires an even higher located steam drum in order to provide the natural circulation of the boiler water to and from the boiler.

Figure 6:
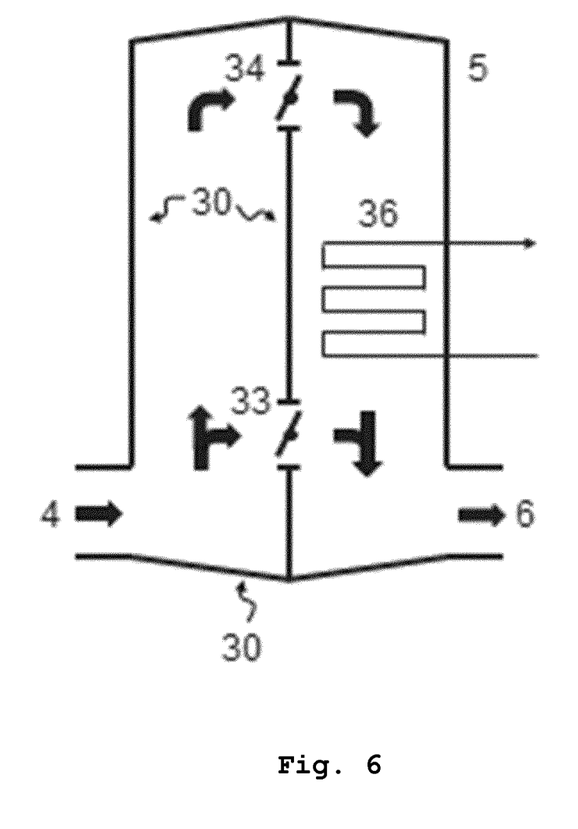

In FIG. 6, a fourth layout of the waste heat boiler is shown, which is applicable in case the process gas needs to be cooled to a temperature below the optimal temperature for radiation heat transfer. It is well known that heat transfer by radiation is most effective at high temperatures (heat transfer is proportional to temperature in fourth power), and thus there is a practical lower limit to the temperature at the outlet of the boiler. This temperature is 500-600° C., and if further cooling is needed, it is necessary to use convective heat transfer, for instance by installing tube banks in the coldest part of the boiler. The distance between these tubes will be similar to what is used in ordinary fire tube boilers and water tube boilers. The tubes can be either horizontal or vertical.

An alternative, which is widely used in e.g. large power plant boilers, is forced circulation, in which the flow of water and steam through the pipes is controlled by a dedicated pump.

The invention is illustrated further in the examples which follow.

EXAMPLE 1

In the commonly used fire tube and water tube boiler design, the heat transfer mechanism is primarily convection. To design an efficient and compact convection type heat exchanger, the process gas velocity has to be as high as possible, and therefore the distance between tubes (in a water tube boiler) and the tube diameter (in a fire tube boiler) must be as small as possible. The drawback of such design is that the tolerance against plugging is low: The distance from the metal surface to the opposing metal surface is short, and thus a relatively thin deposit layer may result in a high degree of constriction of the flow.

The heat transfer distance by means of radiation is significantly higher than the heat transfer distance by means of convection, and thus a radiation-type heat exchanger can be designed with a larger distance between the opposing surfaces. As an example, a fire tube boiler is designed with e.g. a number of 3" tubes (63 mm inner diameter), and a radiation heat exchanger is designed with e.g. 1800 mm open duct between the opposing metal surfaces.

The below Table 1 shows a comparison between a fire tube waste heat boiler design and the membrane wall boiler design according to the invention for treatment of around 4 tons/hour of spent sulfuric acid from an alkylation process.

The fire tube waste heat boiler is a two-pass boiler with 3" tubes in the first pass to increase the plugging resistance and 2" tubes in the second pass to increase the heat transfer rate.

The membrane boiler is a square duct construction as shown in FIG. 3, with wall side widths of 1800 mm.

The process gas is cooled from 1000° C. to 550° C.

Table 1 shows a relative comparison of a 2-pass fire tube waste heat boiler with a membrane wall waste heat boiler. The waste heat boilers are evaluated for a spent sulfuric acid regeneration plant (4 tons/hour), where the process gas is cooled from 1000° C. down to 550° C. in the waste heat boiler.

TABLE 1

|  | 2-pass fire tube waste heat boiler | membrane wall waste heat boiler |
|---|---|---|
| Cooled heat exchange area | 100 | 140 |
| Pressure drop on process gas side | 100 | 20 |

TABLE 1-continued

|  | 2-pass fire tube waste heat boiler | membrane wall waste heat boiler |
|---|---|---|
| Distance between opposing metal walls | 100 | 2500 |
| Cost | 100 | <100 |

As seen in, there are some major differences between the two waste heat boilers. First of all, the heat transfer by convection is more effective than that by radiation, and thus a higher heat exchange area is needed for the membrane wall waste heat boiler to remove the same amount of heat.

As the process gas velocity in the membrane wall heat exchanger is quite low (<5 m/sec), the pressure drop will be considerably lower, thus decreasing the operating cost of process gas blowers.

Most remarkably is the difference in distance between adjacent walls, which means that it is almost impossible that the membrane wall waste heat boiler will plug.

Even if more heat exchange area is installed in the membrane wall heat exchanger, the construction is cheaper than that of the fire tube boiler. This is due to a simpler construction of the membrane wall, where the high pressure water/steam is confined in small tubes, whereas the high pressure water/steam is confined in a large shell in the fire tube boiler. The latter requires an increased metal thickness of tube sheets and pressure shells.

EXAMPLE 2

Using the waste heat boiler dimensions from Example 1, some rough calculations show the improvement in plugging resistance of the membrane wall construction.

For the calculation, a constant deposit layer build-up rate of 1 mm/day is assumed, i.e. the process gas dust has a high plugging potential.

Table 2 below illustrates the effects of deposit build-up on flow and pressure drop through tubes in the fire tube waste heat boiler and the duct in the membrane wall waste heat boiler. A constant deposit layer build-up rate of 1 mm/day is assumed, i.e. the process gas dust exhibits a high plugging potential.

TABLE 2

|  | 2-pass fire tube waste heat boiler | membrane wall waste heat boiler |
|---|---|---|
| Distance between opposing metal walls | Circular, 63 mm | Square, 1800 mm |
| Deposit thickness after 3 weeks of operation | 21 mm | 21 mm |
| Relative available flow area after 3 weeks of operation (100 = clean heat exchanger) | 11 | 95 |
| Relative process gas velocity after 3 weeks of operation (100 = clean heat exchanger) | 900 | 105 |

As shown in Table 2 above, the fire tube boiler is essentially plugged after three weeks of operation, whereas only a very little effect is seen on the membrane wall waste heat boiler.

EXAMPLE 3

Different waste heat boiler configuration layouts to cool a process gas from incineration of so-called spent sulfuric acid are shown in below. More specifically, the process gas flow is 5000 Nm³/h (m³/h evaluated at 0° C. and 1 atm), 10 vol % $SO_2$, 25 vol % $H_2O$ and 10 vol % $CO_2$. The gas components responsible for the radiation of heat from the process gas to the cooled metal surfaces are $SO_2$, $CO_2$ and $H_2O$.

The heat transfer in the fire tube boiler is primarily convective heat transfer, and thus the gas velocity must be high. In the example, only 5-20% of the heat transfer in the fire tube boiler is from gas radiation; 80-95% of the heat is transferred by convective heat transfer. This distribution between convective and radiation heat transfer is typical for both fire tube boilers and water tube boilers.

For the radiation-type waste heat boiler, the heat transfer distribution is the opposite, i.e. 80-95% of the heat is transferred by means of radiation whereas only 5-20% of the heat is transferred by convective heat transfer. The gas velocity is low, decreasing the convective heat transfer rate, while allowing sufficient residence time for the radiation of heat.

TABLE 3

|  | 1-pass fire tube waste heat boiler, 3" tubes | Radiation type waste heat boiler |
|---|---|---|
| Inlet temperature | 1000° C. | 1000° C. |
| Outlet temperature | 540° C. | 535° C. |
| Heat exchange area | 31 m² | 35 m² |
| Cross sectional area | 0.12 m² | 1.5 m² |
| Length in gas direction | 3.6 | 7.0 |
| Gas velocity | 40000 Nm/h | 2500 Nm/h |
| Radiation contribution | 5-20% | 80-95% |

The invention claimed is:

1. A method for the production of sulfur trioxide from a feed stream comprising sulfur-containing compounds and dissolved metals, said process comprising the following steps:
   incineration in the presence of an $O_2$-rich stream, whereby the sulfur-containing compounds in the feed stream are converted to $SO_2$,
   cooling of the gas by means of radiation to recover heat as high pressure steam, wherein at least 50% of the duty in the waste heat boiler is transferred by gas and particle radiation,
   further cooling of the process gas, that leaves the waste heat boiler, in a dilution air heater,
   adding dilution air to the process gas to provide sufficient oxygen for the oxidation of $SO_2$ to $SO_3$ in an $SO_2$ converter, and feeding the diluted process gas to an $SO_2$ converter comprising a number of catalyst layers.

2. Method according to claim 1, wherein the incineration temperature is around 900-1300° C.

3. Method according to claim 1, wherein the temperature of the gas leaving the waste heat boiler is around 400-700° C.

4. Method according to claim 1, wherein the inlet temperature of the catalyst layer(s) of the $SO_2$ converter is around 375-420° C.

5. Method according to claim 1, wherein the converted process gas leaving the $SO_2$ converter is cooled to around 250-310° C.

6. A plant for the production of sulfur trioxide by the method according to claim 1, said plant comprising an incineration furnace, a waste heat boiler, a dilution air heater, a dust removal absorber and an $SO_2$ converter,
   wherein the waste heat boiler is a radiant-type heat exchanger in the form of a membrane wall construction in which the wall constitutes the cooling surface, and the waste heat boiler is configured to accommodate feed streams comprising sulfur-containing compounds and dissolved metals.

7. Plant according to claim 6, further comprising a sulfuric acid condenser for the production of sulfuric acid.

8. Plant according to claim 6, wherein the $SO_2$ converter consists of a number of catalyst layers with heat exchangers installed between the catalyst layers.

9. Plant according to claim 8, wherein the number of catalyst layers is between 2 and 4.

10. Plant according to claim 6, wherein the walls of the waste heat boiler consist of a number of vertical tubes, each separated from the adjacent tubes by metal plates or strips welded to the tubes to make a gas-tight construction.

11. Plant according to claim 6, wherein the waste heat boiler is designed with a bypass damper and a main pass damper located either inside or outside the boiler.

12. Plant according to claim 11, wherein both the bypass damper and the main pass damper are located inside the boiler, and wherein tube banks are installed in the coldest part of the boiler to establish convective heat transfer.

* * * * *